(12) United States Patent
Prebola (10) Patent No.: US 7,418,332 B2
(45) Date of Patent: Aug. 26, 2008

(54) DYNAMIC S CURVE STEPPER MOTOR PROFILE

(75) Inventor: John W. Prebola, Sodus, NY (US)

(73) Assignee: Xerox Corporation, Norwalk, CT (US)

( * ) Notice: Subject to any disclaimer, the term of this patent is extended or adjusted under 35 U.S.C. 154(b) by 515 days.

(21) Appl. No.: 11/119,746

(22) Filed: May 3, 2005

(65) Prior Publication Data
US 2006/0253242 A1 Nov. 9, 2006

(51) Int. Cl.
G06F 19/00 (2006.01)
(52) U.S. Cl. .......................................... 701/70; 701/93
(58) Field of Classification Search ................ 701/1, 701/70; 318/646, 651, 560
See application file for complete search history.

(56) References Cited

U.S. PATENT DOCUMENTS

| | | | |
|---|---|---|---|
| 3,952,238 A | 4/1976 | Cutler | |
| 4,648,026 A | 3/1987 | Petrick | |
| 4,914,726 A * | 4/1990 | Burke | 318/646 |
| 5,086,319 A | 2/1992 | Carolan | |
| 6,179,600 B1 * | 1/2001 | Siegrist et al. | 425/145 |

FOREIGN PATENT DOCUMENTS

EP 0834405 A2 4/1998

OTHER PUBLICATIONS

European Search Report Dated Aug. 7, 2006, which was cited in related EP Application No. 1 719 631 A1.

* cited by examiner

Primary Examiner—Yonel Beaulieu
(74) Attorney, Agent, or Firm—Ronald E. Prass, Jr.; Prass & Irving, LLP (57) ABSTRACT

A technique for implementing dynamic S curve stepper motor velocity profiles provides improved performance in controlling the motion of a mass. A method for controlling a moving mass comprises accelerating the moving mass according to a velocity profile, detecting that the moving mass has a specified position, and altering the velocity profile based on the detection of the moving mass having the specified position. The velocity profile is altered by reducing a maximum velocity of the moving mass, if the moving mass has the specified position before a maximum velocity of the velocity profile is achieved.

17 Claims, 6 Drawing Sheets

DYNAMIC S CURVE STEPPER MOTOR PROFILE

TECHNICAL FIELD

The present disclosure relates to a method for dynamically altering stepper motor velocity profiles based on position detection by a sensor.

BACKGROUND OF THE TECHNOLOGY

Computer controlled stepper motors are one of the most versatile forms of positioning systems, particularly when digitally controlled as part of a servo system. Stepper motors are used in floppy disk drives, flatbed scanners, printers, plotters, and many more devices. Conventionally, a stepper motor positioning system uses a fixed S curve stepper motor profile when smooth motion is needed. This fixed profile has limitations because the stepper run distance is not dynamically alterable, which increases the total cross process registration time for small cross process adjustments.

A need arises for a technique that provides dynamic S curve stepper motor velocity profiles.

SUMMARY OF THE DISCLOSURE

The technology of the present disclosure provides a technique for implementing dynamic S curve stepper motor velocity profiles in firmware, which allows running cross process registration at higher process speeds. In general it allows running a smoother profile. The profile may be implemented by using a low g linear velocity table and controlling the direction and pointer increment size through the table. The pointer change may be dependent on whether a limit condition is detected by a sensor.

In one embodiment described in the present disclosure, a method for controlling a moving mass comprises accelerating the moving mass according to a velocity profile, detecting that the moving mass has a specified position, and altering the velocity profile based on the detection of the moving mass having the specified position. The velocity profile is altered by reducing a maximum velocity of the moving mass, if the moving mass has the specified position before a maximum velocity of the velocity profile is achieved. The velocity profile is defined by a lookup table. The velocity profile is altered by using a lookup table entry that provides an achieved velocity of the moving mass that is lower than the maximum velocity of the velocity profile. The method further comprises decelerating the moving mass using the altered velocity profile. The moving mass is moved using a stepper motor. The moving mass is included in a photocopier, a xerographic photocopier, a paper handler, a document finisher, a scanner, a printer, or a fax machine.

BRIEF DESCRIPTION OF THE DRAWINGS

Objects and advantages of the technology described in the present disclosure will be more clearly understood when considered in conjunction with the accompanying drawings, in which.

DETAILED DESCRIPTION

The technology described in the present disclosure provides a technique for implementing dynamic S curve stepper motor velocity profiles in firmware, which allows running cross process registration at higher process speeds. The profile may be implemented by using a low g linear velocity table and controlling the direction and pointer increment size through the table. The pointer change may be dependent on whether a limit condition is detected by a sensor.

The technology described in the present disclosure is applicable to a variety of electro-mechanical apparatuses, such as xerographic or other photocopiers, paper handlers, document finishers, scanners, printers, fax machines, etc., as well as any device in which a moving mass is accelerated and decelerated. Examples of applications of the technology described in the present disclosure to photocopiers, paper handlers, and document finishers include Side Tampers, Temporary Compilers, Gate Trips, Scuffer Retractors, Trail Edge Tampers, Shutters, Leading Edge Clamps, Ejectors, Inboard/Outboard Stapler Indexers, etc.

Figure 1:
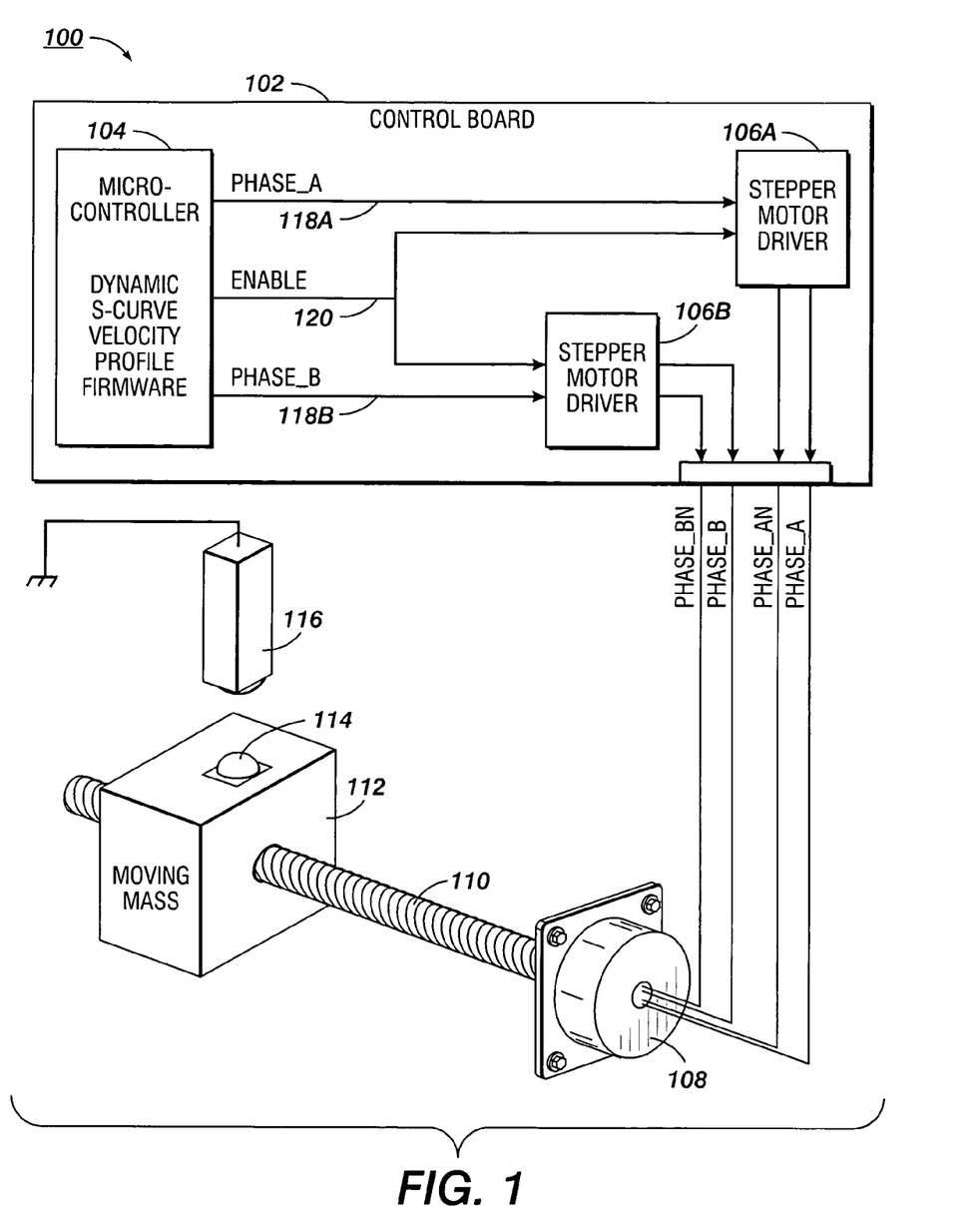
FIG. 1 is an exemplary block diagram of a positioning system in which the technology described in the present disclosure may be implemented.

An example of a positioning system 100 in which the technology described in the present disclosure may be implemented is shown in FIG. 1. System 100 includes control board 102, which includes controller 104 and stepper motor drivers 106A and 106B, stepper motor 108, lead screw 110, moving mass 112, flag 114, and sensor 116. Controller 104 generates control signals that cause stepper motor 108 to move. Typically, controller 104 is a microcontroller, but controller 104 may be implemented in a microprocessor, a computer system, an ASIC, or as other dedicated or special purpose circuitry. The present disclosure contemplates these and any other embodiments of a controller.

In the example shown in FIG. 1, controller 104 generates control signals, such as motor phase A 118A, motor phase B 118B, and driver enable 120. These control signals are input to stepper motor drivers 106A and 106B, which generate the drive currents that cause the rotor of the stepper motor to move. In a stepper motor, an internal rotor containing permanent magnets is controlled by a set of stationary electromagnets that are switched electronically. Stepper motors have a fixed number of magnetic poles that determine the number of steps per revolution. The control signals 118A, 118B, and 120, generated by controller 104, are used by stepper motor drivers 106A and 106B to generate the drive currents that activate the stationary electromagnets in stepper motor 108. By varying the timing and duration of the control signals, controller 104 can control the speed and direction of rotation and the position of the rotor of stepper motor 108.

The rotor of stepper motor 108 is mechanically coupled to a drive mechanism that provides the capability to move a mass, such as moving mass 112. In the example shown in FIG. 1, the drive mechanism is a lead screw 110, which turns as the rotor of stepper motor 108 turns, and which moves moving mass 112 as it turns. Moving mass 112 may be any object or part of a mechanism that is moved by a stepper motor. For example, moving mass 112 may be an output tray full of paper, the position of which is indicated by a sensor. As another example, moving mass 112 may be a cross process registration carriage that registers a sheet of paper to a sensor. The present disclosure contemplates these and any other moving mass. Likewise, in this example, a lead screw is shown as the drive mechanism by which stepper motor 108 drives the motion of moving mass 112. However, any mechanism that can convert rotary motion of the rotor of stepper motor 108 into motion of a coupled mass may be used. For example, gear mechanisms, drive chain mechanisms, etc. may be used. The present disclosure contemplates these and any other mechanisms.

Attached to moving mass 112 is flag 114. Flag 114 may be detected by sensor 116 when moving mass 112 is in a particular position. Typically, sensor 116 is an optical sensor, such as a photo detector or an optical interrupter, and flag 114 is a device that is detectable by the optical sensor, such as a reflective device for use with a photo detector or an optical interruption device for use with an optical interrupter. It is to be noted that these are merely examples of types of sensors that may be used. The present disclosure contemplates these and any other types of sensors.

Figure 2:
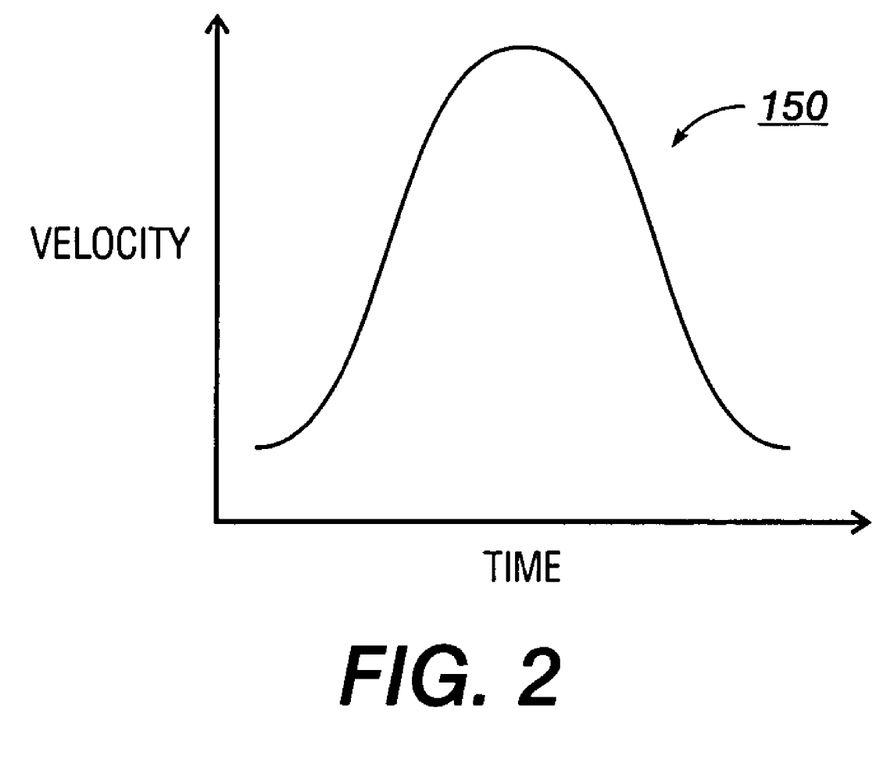
FIG. 2 illustrates an example of a velocity profile of a moving mass shown in FIG. 1.
Figure 3:
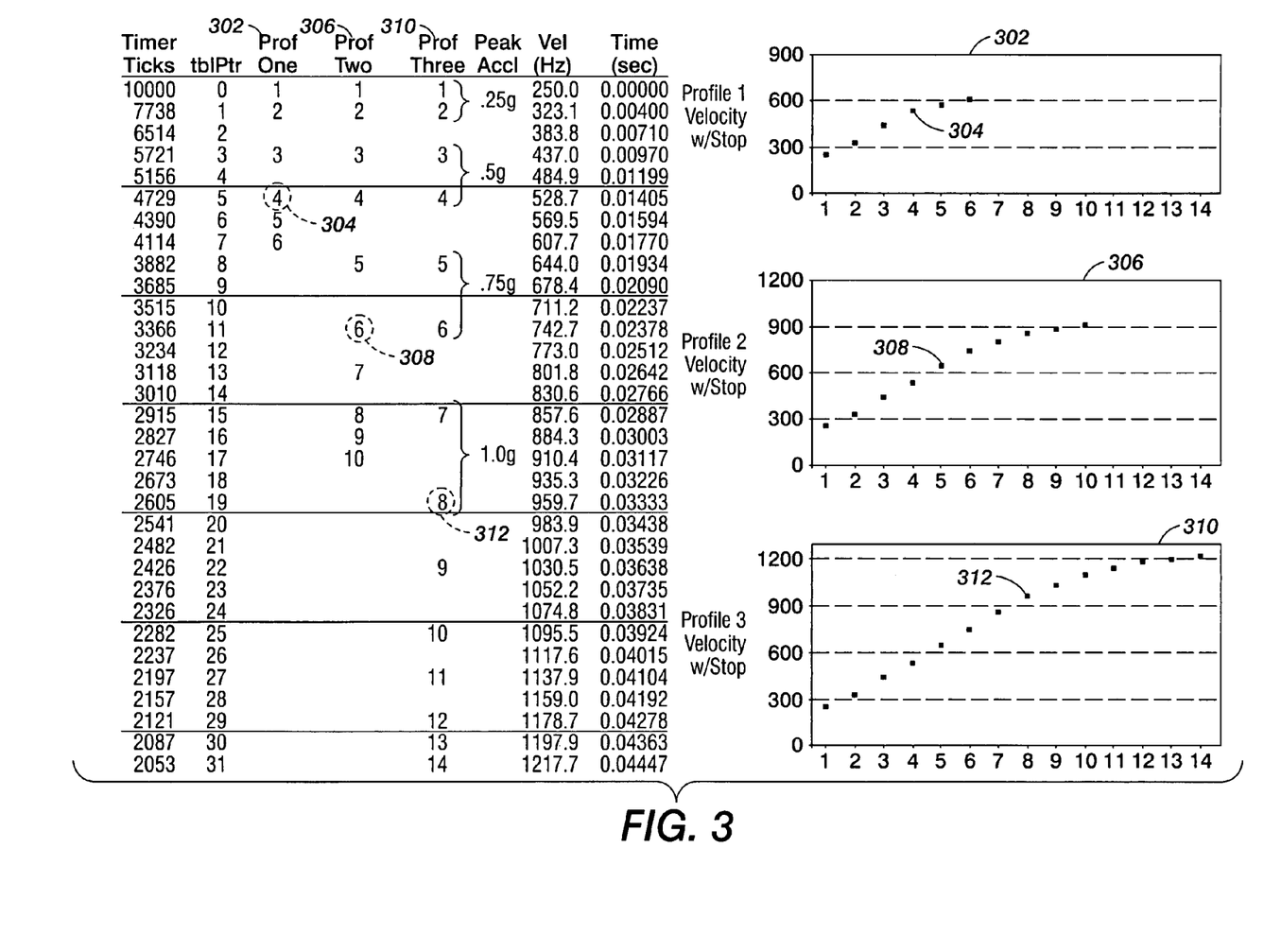
FIG. 3 illustrates examples of velocity profiles that are altered based on detection by the sensor of the moving mass being in a specified position.

An exemplary velocity profile of the motion of moving mass 112 is shown in FIG. 2. This is a well-known velocity profile known as an "S-curve". In this velocity profile, the moving mass accelerates gradually at first, and then ramps up to a maximum velocity for a time. At a given time or indicated position, the moving mass begins a gradual deceleration, and then ramps down to a stop. In the prior art, each time the mass is moved, it follows a fixed velocity profile similar to that shown in FIG. 2. In the technology described in the present disclosure, the velocity profile is not fixed, but rather is altered based on the point in the velocity profile at which the sensor detects the flag. Examples of this are shown in FIG. 3. In these examples, the velocity profile may be altered at each step of the stepper motor. For example, a table pointer to a velocity profile lookup table may be altered at each step of the stepper motor, based on whether or not a sensor has detected a flag, which indicates that the moving mass is in a particular position. As long as the sensor does not detect the flag, the table pointer is incremented until the table entries corresponding to the maximum velocity for the profile are accessed. If the sensor detects the flag at a point in the velocity profile before the maximum velocity is achieved, the table pointer is not incremented to point to entries corresponding to the maximum velocity for the profile. Rather, the table pointer is not incremented any further, or is not incremented fully, which limits the achieved velocity to a value lower than the maximum velocity for the profile In a first exemplary velocity profile 302, the sensor detects the flag at point 304 in the profile. This corresponds to a peak acceleration of 0.5 g and results in a peak stepping frequency for the profile of 607.7 Hz, wherein, with a stepper motor, stepping frequency is directly proportional to rotational velocity, which is directly proportional to velocity of the moving mass. The time to peak velocity is 0.018 seconds. In a second exemplary velocity profile 306, the sensor detects the flag at point 308 in the profile. This corresponds to a peak acceleration of 0.75 g and results in a peak stepping frequency for the profile 910.4 Hz. The time to peak velocity is 0.031 seconds. In a third exemplary velocity profile 310, the sensor detects the flag at point 312 in the profile. This corresponds to a peak acceleration of 1.0 g and results in a peak stepping frequency for the profile 1217.7 Hz. The time to peak velocity is 0.044 seconds. Thus, it is seen that, in the technology described in the present disclosure, the velocity profile is altered based on the point in the velocity profile at which the sensor detects the flag.

Figure 4:
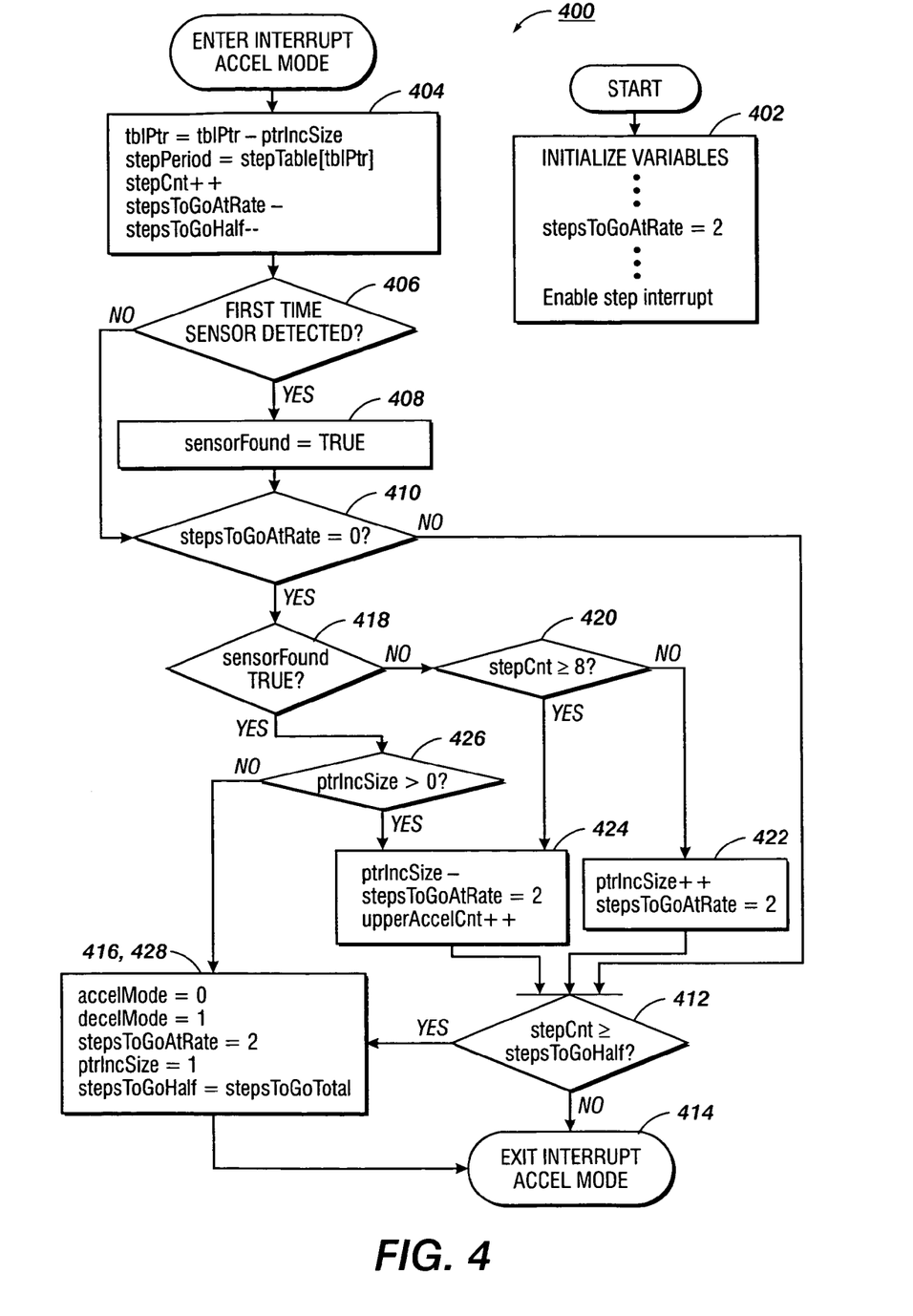
FIG. 4 is a flow diagram of an acceleration of a velocity profile control process.

The velocity profile control process of the present disclosure may be implemented in a controller in a number of ways, as is well known. Examples of such implementations include a polling loop process and an interrupt-driven process. An interrupt-driven process may be used for reasons of processing performance, but the present disclosure contemplates any and all implementations of the velocity profile control process. An example of an interrupt-driven acceleration portion 400 of a velocity profile control process is shown in FIG. 4. Process 400 begins with step 402, in which the variables that are used by the process are initialized. In particular, the variable stepsToGoAtRate can be altered for a desired profile shape. Once the variables are initialized, an interrupt at each step of the stepper motor is enabled. Process 400 then exits until a step interrupt occurs. Process 400 then continues with step 404, in which the period for the next step is obtained from a lookup table and various counters are increments or decremented. In step 404, the step table pointer is incremented by an integer value (ptrIncSize). The table pointer is used to look up a value for the step period in a lookup table. Thus, this increment value determines the acceleration rate. In this example a ptrIncSize of 1 yields an acceleration of 0.25 g, a ptrIncSize of 2 yields an acceleration of 0.5 g, a ptrIncSize of 3 yields an acceleration of 0.75 g, etc. Also, the variable stepsToGoAtRate is decremented. In step 406, it is determined whether the sensor has detected the flag for the first time. If the sensor has detected the flag for the first time, then in step 408, sensorFound is set to TRUE. In step 410, it is determined whether the variable stepsToGoAtRate has reached zero. If the variable stepsToGoAtRate has not reached zero, then the process continues with step 412, in which it is determined whether half the steps in the velocity profile have occurred. If half the steps in the velocity profile have not occurred, then in step 414, exits until the next step interrupt occurs. If half the steps in the velocity profile have occurred, then in step 416, variables are set to indicate that the profile control process should enter the deceleration portion of the process, shown in FIG. 5.

In step 410, if the variable stepsToGoAtRate has reached zero, then the process continues with step 418, in which it is determined whether the sensor has been found (sensorFound=TRUE). If the sensor has not been found, then in step 420, it is determined whether the maximum velocity of the profile has been reached. If the maximum velocity of the profile has not been reached, then in step 422, the acceleration continues with an increment of the pointer. If the maximum velocity of the profile has been reached, then in step 424, the pointer increment size is set to zero and the maximum velocity is maintained. The process then continues with step 412.

If, in step 418, it is determined that the sensor has been found, then the process continues with step 426, in which it is determined whether the maximum velocity of the profile has previously been reached. If the maximum velocity of the profile has previously not been reached, then the process continues with step 424, in which the pointer increment size is set to zero and the current velocity of the profile is maintained and so becomes the maximum velocity for this instance of the profile. If the maximum velocity of this instance of the profile has previously been reached, then the process continues with step 428, in which variables are set to indicate that the profile control process should enter the deceleration portion of the process, shown in FIG. 5.

Figure 5:
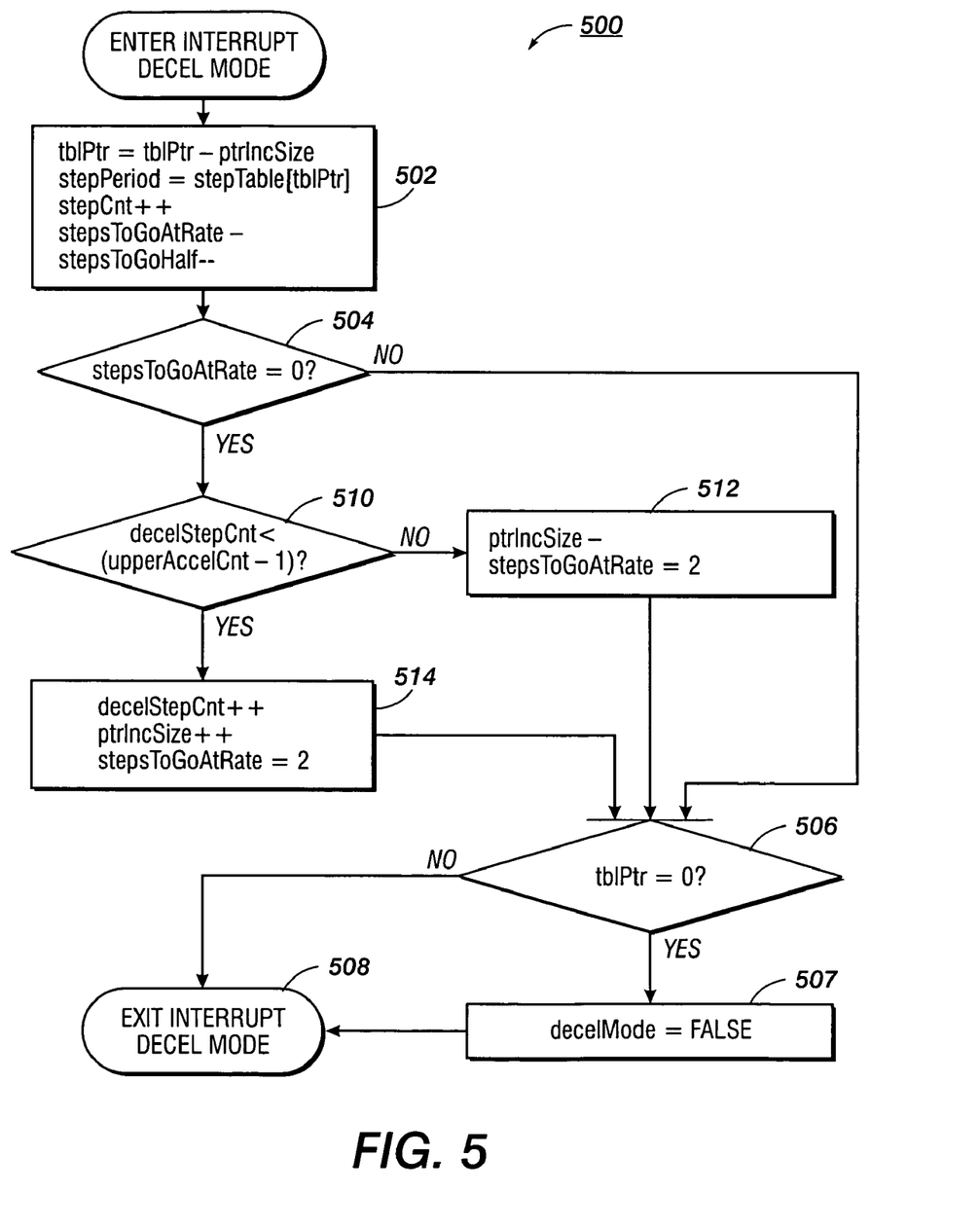
FIG. 5 is a flow diagram of a deceleration of a velocity profile control process.

An example of an interrupt-driven acceleration portion 500 of a velocity profile control process is shown in FIG. 5. The overall function of process 500 is to decelerate the moving mass with a velocity profile that mirror the profile used during the acceleration portion of the process. When a step interrupt occurs, process 500 begins with step 502, in which the period for the next step is obtained from a lookup table and counters are incremented or decremented. In step 504, it is determined whether the maximum velocity portion of the profile has finished and the deceleration should start. If the maximum velocity portion of the profile has not finished, then the process continues with step 506, in which it is determined whether the deceleration portion of the process is done. If not, then, in steps 507 and 508, the deceleration portion of the process exits to wait for the next interrupt.

If, in step 504, it is determined that the maximum velocity portion of the profile has finished, then the process continues with steps 510, 512, and 514, which produce a deceleration portion of the velocity profile that mirrors the corresponding acceleration portion of the profile.

Figure 6:
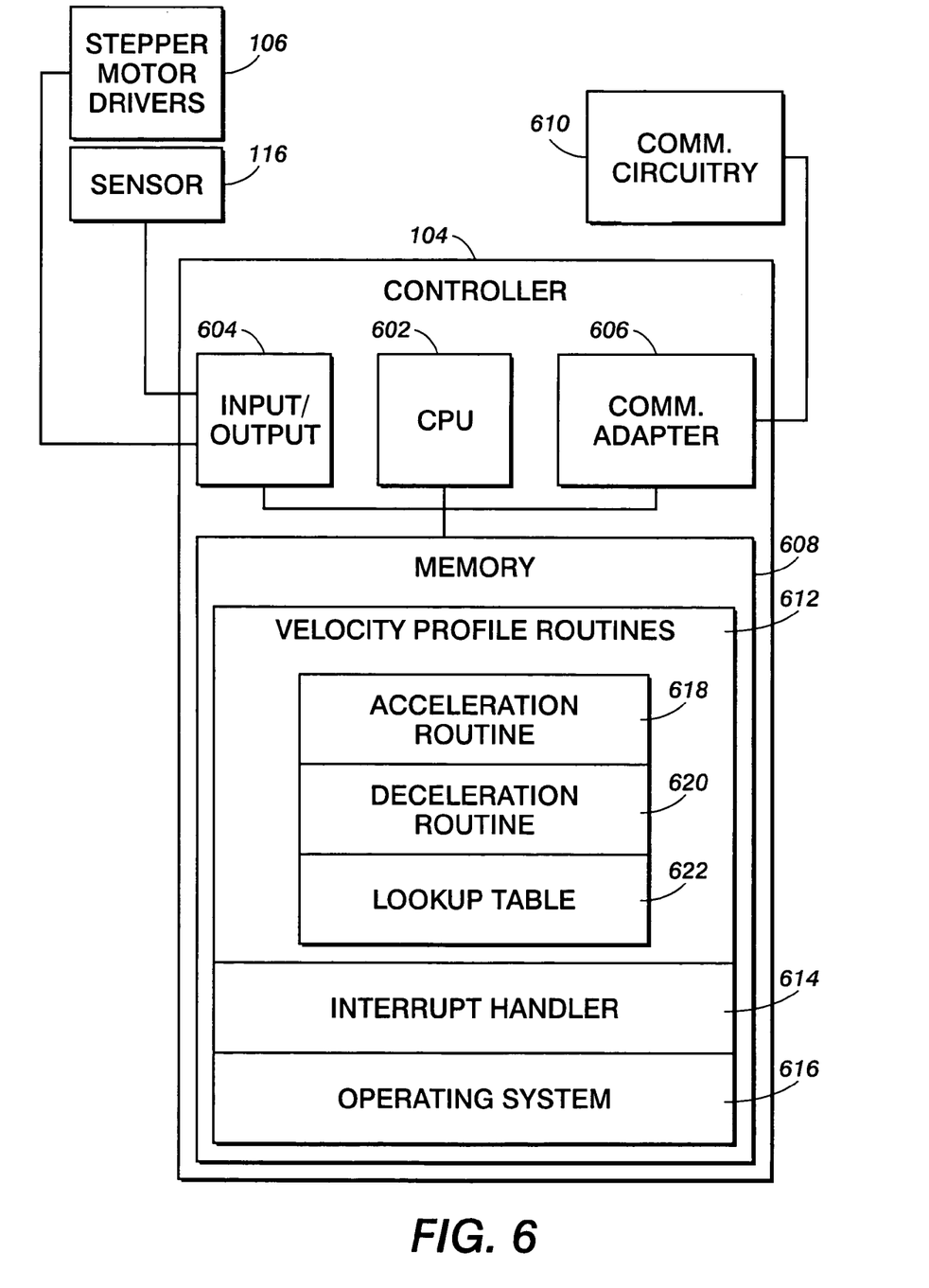
FIG. 6 is an exemplary block diagram of a system, in which the technology described in the present disclosure may be implemented.

A block diagram of a system 600, in which the technology described in the present disclosure may be implemented, is shown in FIG. 6. System 600 includes controller 104, which is typically a microcontroller, but controller 104 may be implemented in a microprocessor, a computer system, an ASIC, or as other dedicated or special purpose circuitry. In the example shown in FIG. 6, controller 104 is a microcontroller, which includes processor (CPU) 602, input/output circuitry 604, communications adapter 606, and memory 608. CPU 602 executes program instructions in order to carry out the functions of the technology described in the present disclosure.

Input/output circuitry 604 provides the capability to input data to, or output data from, computer system 600. For example, input/output circuitry may interface with devices such as sensor 116 and stepper motor drivers 106. Input devices may also include devices such as those that may control the operation of the apparatus in which controller 104 is included, such as keyboards, mice, touchpads, trackballs, etc., output devices, such as those that may display information about the operation of the apparatus in which controller 104 is included, such as video adapters, monitors, LCD screens, etc., and input/output devices, such as, modems, etc. Communications adapter 606 interfaces controller 104 with communication circuitry 610, which may provide communications with other devices in the apparatus in which controller 104 is included or with other apparatuses that are communicatively connected to the apparatus in which controller 104 is included.

Memory 608 stores program instructions that are executed by, and data that are used and processed by, CPU 602 to perform the functions of the technology described in the present disclosure. Typically, memory 608 is electronic memory that is included in controller 104, such as random-access memory (RAM), read-only memory (ROM), programmable read-only memory (PROM), electrically erasable programmable read-only memory (EEPROM), flash memory, etc. However, memory 608 may also include electro-mechanical memory that is connected to controller 104, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

Memory 608 includes velocity profile routines 612, interrupt handler 614, and operating system 616. Velocity profile routines 612 provide the dynamic velocity profile alteration of the present disclosure. Velocity profile routines 612 include acceleration routine 618, deceleration routine 620, and lookup table 622. Acceleration routine 618 provides an acceleration velocity profile for a moving mass that is altered based on when sensor 116 detects a flag indicating a position of the moving mass. Deceleration routine 620 provides a deceleration velocity profile for the moving mass, which is typically a profile that mirrors the acceleration velocity profile. Lookup table 622 provides the acceleration/deceleration values that are used in the acceleration and deceleration velocity profiles.

Interrupt handler 614 receives interrupt events and invokes the appropriate routine for processing the interrupt event. For example, interrupt handler 614 receives step interrupt events and invokes velocity profile routines to process the step interrupt events. Operating system 612 provides overall system functionality.

Although specific embodiments of the technology of the present disclosure have been described, it will be understood by those of skill in the art that there are other embodiments that are equivalent to the described embodiments. Accordingly, it is to be understood that the disclosure is not to be limited by the specific illustrated embodiments, but only by the scope of the appended claims.

The invention claimed is:

1. A method for controlling a moving mass comprising:
accelerating the moving mass according to a velocity profile;
detecting that the moving mass has a specified position; and
altering the velocity profile based on the detection of the moving mass having the specified position by reducing a maximum velocity of the moving mass if the moving mass has the specified position before a maximum velocity of the velocity profile is achieved.

2. The method of claim 1, wherein the velocity profile is defined by a lookup table.

3. The method of claim 2, wherein the velocity profile is altered by using a lookup table entry that provides an achieved velocity of the moving mass that is lower than the maximum velocity of the velocity profile.

4. The method of claim 3, further comprising decelerating the moving mass using the altered velocity profile.

5. The method of claim 4, wherein the moving mass is moved using a stepper motor.

6. The method of claim 5, wherein the moving mass is included in a photocopier, a xerographic photocopier, a paper handler, a document finisher, a scanner, a printer, or a fax machine.

7. A system for controlling a moving mass comprising:
an electro-mechanical apparatus operable to accelerate the moving mass according to a velocity profile; and
a sensor operable to detect that the moving mass has a specified position;
wherein the electro-mechanical apparatus is further operable to alter the velocity profile based on the detection of the moving mass by the sensor by reducing a maximum velocity of the moving mass if the sensor detects the moving mass before a maximum velocity of the velocity profile is achieved.

8. The method of claim 7, wherein the velocity profile is defined by a lookup table.

9. The method of claim 8, wherein the velocity profile is altered by using a lookup table entry that provides an achieved velocity of the moving mass that is lower than the maximum velocity of the velocity profile.

10. The method of claim 9, further comprising decelerating the moving mass using the altered velocity profile.

11. The method of claim 10, wherein the electro-mechanical apparatus comprises a stepper motor and a controller.

12. The method of claim 11, wherein the moving mass is included in a photocopier, a xerographic photocopier, a paper handler, a document finisher, a scanner, a printer, or a fax machine.

13. A system for controlling a moving mass comprising:

a processor operable to execute computer program instructions;

a memory operable to store computer program instructions executable by the processor; and computer program instructions stored in the memory and executable to perform the steps of:

accelerating the moving mass according to a velocity profile;

detecting that the moving mass has a specified position; and altering the velocity profile based on the detection of the moving mass having the specified position by reducing a maximum velocity of the moving mass if the moving mass has the specified position before a maximum velocity of the velocity profile is achieved.

14. The system of claim 13, wherein the velocity profile is defined by a lookup table.

15. The system of claim 14, wherein the velocity profile is altered by using a lookup table entry that provides an achieved velocity of the moving mass that is lower than the maximum velocity of the velocity profile.

16. The system of claim 15, further comprising decelerating the moving mass using the altered velocity profile.

17. The system of claim 16, wherein the moving mass is included in a photocopier, a xerographic photocopier, a paper handler, a document finisher, a scanner, a printer, or a fax machine.

* * * * *